United States Patent
Jones et al.

(10) Patent No.: US 10,719,312 B2
(45) Date of Patent: Jul. 21, 2020

(54) SYSTEMS AND METHODS FOR ASSESSING CONFIGURATION FILES ASSOCIATED WITH A PROCESS CONTROL SYSTEM

(71) Applicant: FISHER-ROSEMOUNT SYSTEMS, INC., Round Rock, TX (US)

(72) Inventors: Aaron C. Jones, Round Rock, TX (US); Michael G. Ott, Round Rock, TX (US); Julian K. Naidoo, Cedar Park, TX (US); Deborah R. Colclazier, Round Rock, TX (US); Karen Johnson, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 15/722,306

(22) Filed: Oct. 2, 2017

(65) Prior Publication Data

US 2019/0079755 A1  Mar. 14, 2019

Related U.S. Application Data

(60) Provisional application No. 62/558,330, filed on Sep. 13, 2017.

(51) Int. Cl.
*G06F 9/44* (2018.01)
*G06F 8/71* (2018.01)
(Continued)

(52) U.S. Cl.
CPC ............. *G06F 8/71* (2013.01); *F01K 13/02* (2013.01); *G05B 19/0405* (2013.01);
(Continued)

(58) Field of Classification Search
CPC ........................................................ G06F 8/71
See application file for complete search history.

(56) References Cited

U.S. PATENT DOCUMENTS 7,657,582 B1 * 2/2010 Cram ................. G06F 11/1435
707/640
7,831,959 B1 * 11/2010 Perry ................. G06F 9/44505
717/121

(Continued)

FOREIGN PATENT DOCUMENTS

EP  2 703 923 A2  3/2014
JP  6-324727 A  11/1994

OTHER PUBLICATIONS

Search Report for Application No. GB1813775.2, dated Feb. 25, 2019.

*Primary Examiner* — Hang Pan
(74) *Attorney, Agent, or Firm* — Marshall, Gerstein & Borun LLP

(57) ABSTRACT

Techniques for assessing and managing versions of a configuration file associated with a modular control system of a process plant are described. According to certain aspects, systems and methods device may access data associated with multiple versions of a configuration file, including a computing device version and a control version, as well as a last backup instance of the configuration file. The systems and methods may compare the versions and determine any discrepancies between the versions, including which of the versions is the most recent. The systems and methods may present information associated with the comparison to enable a user to select which of the versions may be need to be updated, resolved, or provided to the controller so that the modular control system may be properly configured.

23 Claims, 7 Drawing Sheets

(51) Int. Cl.
*F01K 13/02* (2006.01)
*G05B 19/04* (2006.01)
*G06F 9/445* (2018.01)
*G05B 19/042* (2006.01)
*G06F 11/14* (2006.01)

(52) U.S. Cl.
CPC ..... *G05B 19/0428* (2013.01); *G06F 9/44536* (2013.01); *G06F 11/1448* (2013.01)

(56) References Cited

U.S. PATENT DOCUMENTS

| | | | |
|---|---|---|---|
| 8,850,547 B1 * | 9/2014 | Feeser | H04L 63/0272 |
| | | | 726/9 |
| 2008/0033753 A1 * | 2/2008 | Canda | G06F 19/00 |
| | | | 705/2 |
| 2015/0120670 A1 * | 4/2015 | Fitzgerald | G06F 8/60 |
| | | | 707/649 |
| 2016/0224329 A1 * | 8/2016 | Whitney | G06F 9/44505 |
| 2017/0235302 A1 | 8/2017 | Hozoji | |

* cited by examiner

SYSTEMS AND METHODS FOR ASSESSING CONFIGURATION FILES ASSOCIATED WITH A PROCESS CONTROL SYSTEM

CROSS-REFERENCE TO RELATED APPLICATIONS

This application claims priority benefit of U.S. Provisional Application No. 62/558,330, filed Sep. 13, 2017, the disclosure of which is incorporated by reference in its entirety.

FIELD OF THE TECHNOLOGY

This disclosure relates generally to using modular control systems such as skid-mounted systems with process plants and, in particular, to effectively and efficiently assessing and managing configuration files associated with the modular control systems.

BACKGROUND

Modular control systems, used today in a variety of industries, are complete control systems that can provide specific functionality, such as boiling water, filtering liquids, or controlling heat exchange. A modular control system typically is implemented as a skid-mounted system, or simply "skid," so called because the system is enclosed within a frame and is easily transported. A skid can be delivered to a factory as an integral unit, without being disassembled and reassembled, and typically preconfigured by the manufacturer. A skid generally includes a programmable logic controller (PLC), specialized equipment such as valves or boilers, and sensors such as pressure or temperature sensors, for example.

On the other hand, distributed control systems (DCS) also are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Devices operating in process control and industrial automation systems can be interconnected in a wired or wireless manner, and communicate using industrial communication protocols such as FOUNDATION™ Fieldbus, HART®, or Profibus. Further, protocols such as Modbus have been developed to interconnect PLCs. Still further, in addition to standard industrial automation protocols there exist proprietary protocols for interconnecting nodes in a process control system. DeltaV is an example of one such protocol. In general, these protocols specify formats for conveying measurements, alerts and status reports, commands that affect process variables or automation parameters, commands for activating or deactivating devices, etc. A typical industrial communication protocol also supports device configuration, via pre-defined commands or commands defined by manufacturers for specific devices in accordance with the syntax of the protocol.

A modular control system may be programmed to operate according to a configuration file that may be stored local to the modular control system (e.g., in a memory of a controller). Multiple computing devices or hosts may be configured to interface with the modular control system, where each computing device may, in certain situations, update the configuration file (i.e., configure the modular control system), such as with a version of the configuration file stored on the computing device. For example, a technician associated with the process plant and a technician associated with an OEM that manufactured the modular control system may periodically configure the modular control system.

However, problems arise when multiple computing devices configure the modular control system, as versions of the configuration file may not reflect the most up-to-date version used by the modular control system. For example, a computing device attempting to configure the modular control system may not have the version of the configuration file that was most recently used to configure the modular control system. Accordingly, certain configuration updates and fixes may not be included in, or may be inadvertently removed from, certain configuration instances.

SUMMARY

A modular controller of this disclosure operates in a modular control system, such as a skid-mounted system, to execute the control logic of the modular control system independently of other controllers, similar to a PLC. The modular controller may locally store a version of a configuration file that reflects the configuration of the modular control system. Computing devices or hosts are configured to interface with the modular controller to facilitate updating of the configuration file, such as with a version of the configuration file stored or accessed by the computing devices. The computing devices are configured with user interfaces to present information associated with the versions of the configuration file, and enable the user to facilitate certain functionalities to ensure that the proper version is used to configure the modular controller.

In an embodiment, a computer-implemented method in a computing device of assessing versions of a configuration file associated with a modular control system in a process plant is provided. The computing device may store a computing device version of the configuration file, and the method may include: interfacing, by the computing device, with a controller associated with the modular control system, the controller having a memory incorporated therein that stores a controller version of the configuration file; identifying a last backup instance of the configuration file representing a most recent backup of the configuration file on the controller by the computing device; comparing, by a processor of the computing device, the computing device version of the configuration file to the controller version of the configuration file; and presenting, via a user interface of the computing device, (i) an indication of each of the computing device version of the configuration file, the last backup instance of the configuration file, and the controller version of the configuration file, and (ii) a result of the comparing.

In another embodiment, a computing device for assessing versions of a configuration file associated with a modular control system in a process plant is provided. The computing device may include a communication port, a user interface, a device memory storing (i) a set of computer-executable instructions, (ii) a computing device version of the configuration file, and (iii) a record of a last backup instance of the configuration file representing a most recent backup of the configuration file, by the computing device, on a controller associated with the modular control system, and a processor interfacing with the communication port, the user interface, and the memory. The processor may be configured to execute the set of computer-executable instructions to cause the processor to: interface, via the communication port, with the controller associated with the modular control system, the controller having a memory incorporated therein that stores a controller version of the configuration file, compare the computing device version of the configuration file to the controller version of the configuration file, and cause the user interface to present (i) an indication of each of the computing device version of the configuration file, the last backup instance of the configuration file, and the controller version of the configuration file, and (ii) a result of the comparing.

In a further embodiment, a computer-implemented method in a computing device of managing versions of a configuration file associated with a modular control system in a process plant is provided. The computing device may store a computing device version of the configuration file, and the method may include: interfacing, by the computing device, with a controller associated with the modular control system, the controller having a memory incorporated therein that stores a controller version of the configuration file; comparing, by a processor of the computing device, the computing device version of the configuration file to the controller version of the configuration file; presenting, via a user interface of the computing device, (i) an indication of each of the computing device version of the configuration file, the controller version of the configuration file, and a last backup instance of the configuration file representing a most recent backup of the configuration file, by the computing device, on the controller, and (ii) a result of the comparing; receiving, via the user interface, a user selection associated with the result of the comparing; and based on the user selection, facilitating an update of at least one of: the computing device version of the configuration file and the controller version of the configuration file.

In an additional embodiment, a modular control system in a process plant is provided. The modular control system may include a set of process control devices communicatively connected to operate to control a set of processes, a controller storing a controller version of a configuration file, and configured to operate the set of process control devices according to the controller version of the configuration file, and a computing device configured to interface with the controller, and storing (i) a computing device version of the configuration file, and (ii) a record of a last backup instance of the configuration file representing a most recent backup of the configuration file, by the computing device, on the controller. The computing device may be further configured to: compare the computing device version of the configuration file to the controller version of the configuration file, and present, via a user interface, (i) an indication of each of the computing device version of the configuration file, the last backup instance of the configuration file, and the controller version of the configuration file, and (ii) a result of the comparing.

Still another embodiment of these techniques is a computing devices including one or more processors and a non-transitory computer-readable medium storing instructions that implement the functionalities as described herein.

DETAILED DESCRIPTION

Figure 1:
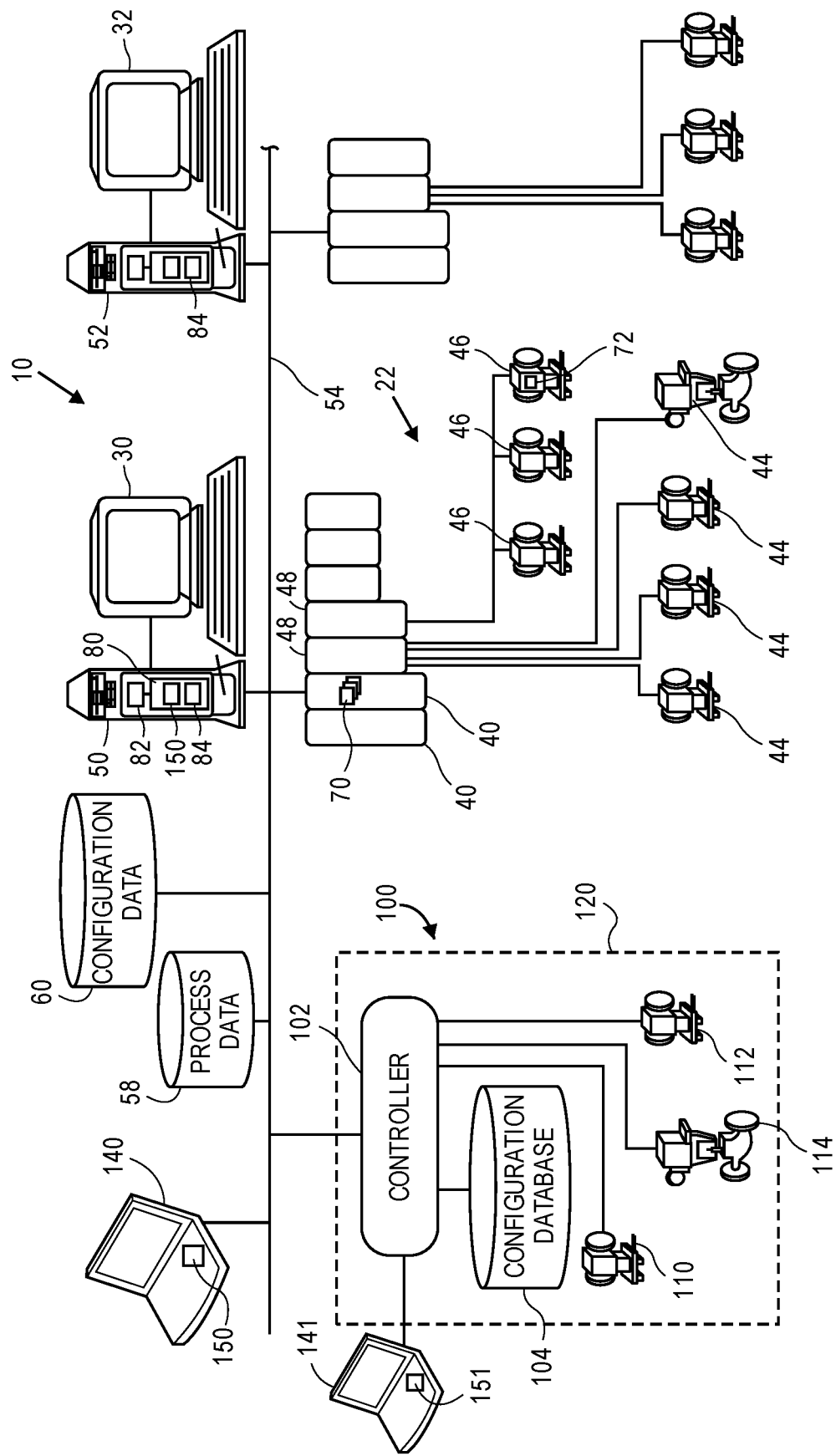
FIG. 1 is a block diagram of a distributed process control system into which an example modular control system may be integrated, according to certain embodiments.

Generally, a modular control system of this disclosure includes a controller that may operate as a standalone PLC, a controller of a skid-mounted system, or as a module in modular plant construction. The controller, referred to below as "modular controller," or in some instances just "controller," can be built natively on a platform such as DeltaV, which supports distributed control, so that the configuration, security mechanisms, and the communications of the modular controller are fully compatible with the DCS into which the modular controller is integrated, where the DCS may be built on the same platform or on a different, possibly proprietary platform. According to embodiments as discussed herein, the modular control system may additionally or alternatively operate separate and independent from the DCS.

According to the systems and methods as discussed herein, the controller of the modular control system may be communicatively connected to a set of process control devices configured to operate a set of processes according to a configuration file that is stored on or accessed by the controller. Occasionally, a user (e.g., an administrator, technician, engineer, or the like) may wish to update the configuration file, such as to fix an error(s) or bug(s), update a setting(s), implement a new or updated process(es), or for other reasons, including to ascertain which version of the configuration file is stored on the controller. To facilitate the updating or assessing, the user may employ a computing device (e.g., a laptop computer or other device) that may communicatively connect to the controller, where the computing device stores its own version of the configuration file as well as data indicating when the computing device last updated the configuration file stored on the controller.

The computing device may interface with the controller to obtain data associated with the version of the configuration file stored on the controller, and may compare the multiple versions (or data associated with the multiple versions) to determine how, if at all, to update the configuration file stored on the controller and/or the configuration file stored on the computing device. In a particular scenario, the controller version of the configuration file may be more recent than the version associated with the computing device. In another scenario, the version on the computing device may be more recent than the version stored on the controller. Additional scenarios are discussed herein.

The computing device may present, via a user interface, information associated with the various versions of the configuration file as well as any differences among the versions (e.g., which version(s) is most up-to-date). The user may review the presented information and facilitate certain functionalities associated with the configuration file, such as updating the version stored on the controller and/or the version stored on the computing device, or resolving discrepancies between the device and controller versions.

The systems and methods therefore offer numerous benefits. In particular, the systems and methods determine a difference(s) among different versions of a configuration file, and effectively present the differences for review by a user. Thus, the user is able to select how to resolve the difference(s) among the versions, and facilitate functionalities associated with the resolving. As a result, the user as well as additional users associated with the modular control system may effectively review and update the configuration file stored on the controller with knowledge that the configuration file is up-to-date. It should be appreciated that additional benefits are envisioned.

FIG. 1 illustrates an example process plant 10 that implements a distributed control system 22. As is typical, the distributed process control system 22 has one or more controllers 40, each connected to one or more field devices or smart devices 44 and 46 via input/output (I/O) devices or cards 48 which may be, for example, Fieldbus interfaces, Profibus interfaces, HART interfaces, standard 4-20 ma interfaces, etc. The controllers 40 are also coupled to one or more host or operator workstations 50, 52 via a data highway 54 which may be, for example, an Ethernet link or another link suitable local area network (LAN) link. A process data database 58 may be connected to the data highway 58 and operates to collect and store parameter, status and other data associated with the controllers and field devices within the plant 10. During operation of the process plant 10, the process data database 58 may receive process data from the controllers 40 and, indirectly, devices 44-46 via the data highway 54.

A configuration database 60 stores the current configuration of the process control system 22 within the plant 10 as downloaded to and stored within the controllers 40 and field devices 44 and 46. The configuration database 60 stores process control functions defining the one or several control strategies of the process control system 22, configuration parameters of the devices 44 and 46, the assignment of the devices 44 and 46 to the process control functions, and other configuration data related to the process plant 10. The configuration database 60 additionally may store graphical objects to provide various graphical representations of elements the process plant 10. Some of the stored graphical objects may correspond to process control functions (e.g., a process graphic developed for a certain PID loop), and other graphical objects may be device-specific (e.g., a graphic corresponding to a pressure sensor).

The process plant 10 also can include other databases coupled to the data highway 54, not shown in FIG. 1 to avoid clutter. For example, a data historian can store events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository can store references, operator logbook entries, help topics, or links to these and other documentation that operators and maintenance technicians may find useful when supervising the process plant 10. Still further, a user database can store information about users such as the operator 12 and the maintenance technician 16. For each user, the user database can store, for example, his or her organizational role, an area within the process plant 10 with which the user is associated, work team association, etc.

Each of these databases can be any desired type of a data storage or collection unit having any desired type of memory and any desired or known software, hardware or firmware for storing data. Of course, the databases need not reside in separate physical devices. Thus, in some embodiments, some of these databases are implemented on a shared data processor. In general, it is possible to utilize more or fewer databases to store the data collectively stored and managed by the databases described above.

While the controllers 40, I/O cards 48 and field devices 44 and 46 are typically distributed throughout the sometimes harsh plant environment, the operator workstations 50 and 52 and the databases 58, 60, etc. are usually located in control rooms or other less harsh environments easily assessable by controller, maintenance, and various other plant personnel. However, in some cases, handheld devices may be used to implement these functions and these handheld devices are typically carried to various places in the plant.

As is known, each of the controllers 40, which may be by way of example, the DeltaV™ controller sold by Emerson Process Management, stores and executes a controller application that implements a control strategy using any number of different, independently executed, control modules or blocks 70. Each of the control modules 70 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique. Each of the controllers 40 may also support the AMS® Suite of applications and may use predictive intelligence to improve availability and performance of production assets including mechanical equipment, electrical systems, process equipment, instruments, field and smart field devices 44, 46, and valves.

In the plant 10 illustrated in FIG. 1, the field devices 44 and 46 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 46 in FIG. 1), may store and execute modules, or sub-modules, such as function blocks, associated with the control strategy implemented in the controllers 40. Function blocks 72, which are illustrated in FIG. 1 as being disposed in two different ones of the Fieldbus field devices 46, may be executed in conjunction with the execution of the control modules 70 within the controllers 40 to implement process control, as is well known. Of course, the field devices 44 and 46 may be any types of devices, such as sensors, valves, transmitters, positioners, etc. and the I/O devices 48 may be any types of I/O devices conforming to any desired communication or controller protocol such as HART, Fieldbus, Profibus, etc.

The workstations 50 and 52 can include one or more processors 82 that execute instructions stored in memory 80. The instructions can implement, in part, a viewing application 84 that provides various displays during operation of the process plant 10 to enable the operator 12 to view and control various operations within the process plant 10 or, as is common in larger plants, within a section of the process plant 10 to which the corresponding operator is assigned. The viewing application 84 may include, or cooperate with, support applications such as control diagnostic applications, tuning applications, report generation applications or any other control support applications that may be used to assist the operator 12 in performing control functions. Further, the viewing application 84 can permit a maintenance technician to supervise the maintenance needs of the plant 10, e.g., to view the operating or working conditions of various devices 40, 44, and 46. The viewing application also may include support applications such as maintenance diagnostic applications, calibration applications, vibration analysis applications, report generation applications or any other maintenance support applications that may be used to assist the maintenance technician 14 in performing maintenance functions within the plant 10.

The process plant 10 may further include an example modular control system 100 that may include a modular controller 102, a configuration database 104, and specialized equipment that can include field devices 110, 112, 114. The modular control system 100 can be a skid-mounted system in which the devices 102, 104, 110, 112, 114 reside within a physical frame 120. The modular control system 100 can be configured to operate in a standalone mode and perform a relatively complex function in a plant, such as pump liquid in a controlled manner, heat water and maintain a certain temperature in a tank, perform a filtration function, etc. To this end, the modular control system 100 can include valves, tanks, sensors, etc. Additionally, although FIG. 1 depicts the modular control system 100 as connected to and interfaced with the control system 22, it should be appreciated that the modular control system 100 may be separate and independent from the control system 22.

The modular controller 102 can be built natively on the platform of the distributed control system 22. In other words, the modular controller 102 is developed specifically for use in the distributed control system 22, while also being capable of autonomous operation, such as if the modular control system 100 is separate from the control system 22. To this end, the modular controller 102 can include firmware and/or software functions that does not require an intermediary (such as a porting/adaptation layer of firmware and/or software or the corresponding application programming interface (API) functions) to interact with the nodes of the distributed control system 22. The modular controller 102 in a certain software architecture shares one or more software layers with other controllers of the distributed control system 22. In any case, as native to the platform of the distributed control system 22, configuration, security mechanisms, and the communications of the modular controller 102 are fully compatible with the distributed control system 22.

The configuration database 104 can be stored on a non-transitory computer-readable memory such as a hard disk, a flash drive, or an SD card, for example. The computer-readable memory and the modular controller 102 can be provided as part of a single chipset (i.e., the computer-readable memory may be included as part of the controller 102) or separately, depending on the implementation.

A manufacturer can assemble the modular control system 100, configure the parameters of the modular control system 100 with setpoint values and other parameter such as the gain value for a PID loop, names and tags for the field devices 110, licenses, locales, etc. The manufacturer also can configure parameter security. For example, the manufacturer can make the gain value a part of restricted control, and require that this value be changed only upon providing a proper key to unlock this variable. In some cases, the manufacturer can completely assemble the modular control system 100 for shipping as an integral unit.

If the modular control system 100 is connected to the control system 22, then the modular control system 100 may operate the field devices 110, 112, 114 according to the current configuration of the control system 22 stored in the configuration database 60. However, if the modular control system 100 is not connected to the control system 22, then the modular control system 100 may operate the field devices 110, 112, 114 according to a configuration file stored in the configuration database 104 associated with the controller 102. The version of the configuration file stored in the configuration database 104 is referred to herein as the "controller version" of the configuration file.

Figure 4:
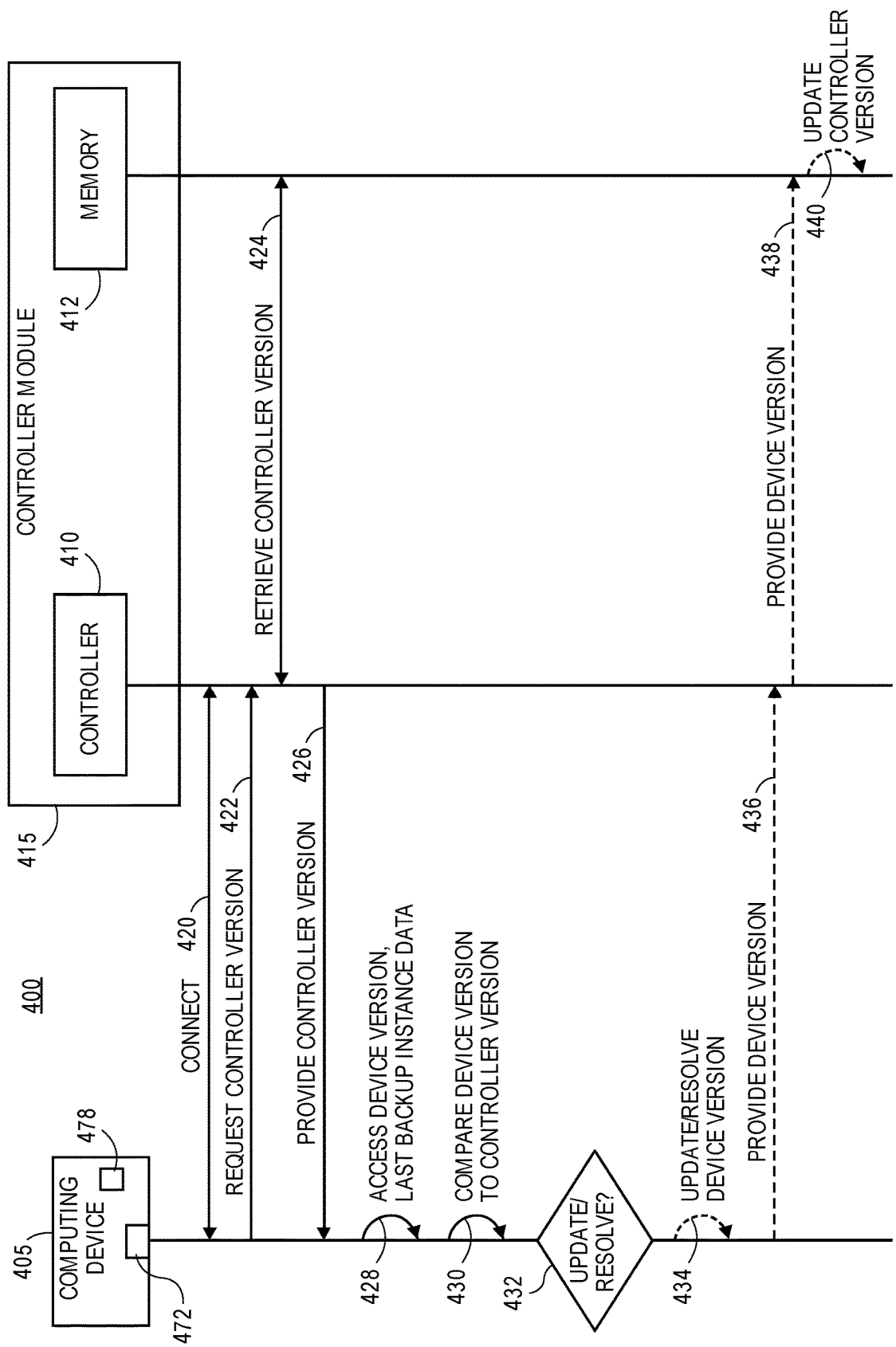
FIG. 4 is a signal diagram associated with assessing and managing versions of a configuration file, according to certain embodiments.
Figure 5:
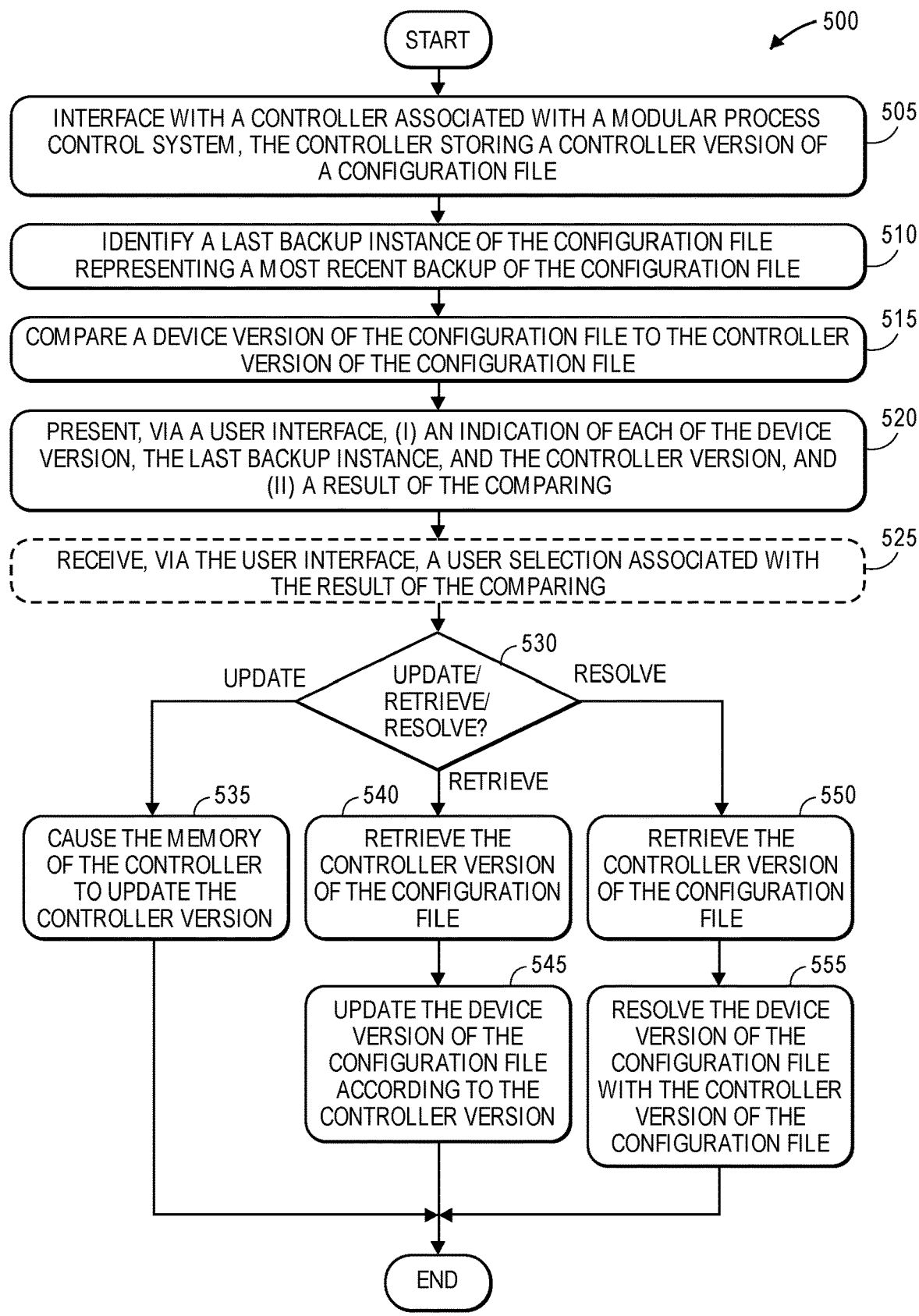
FIG. 5 is a flow diagram of an example method of assessing versions of a configuration file associated with a modular control system in a process plant, according to certain embodiments.

According to embodiments, an additional or alternative host 141 may connect to the controller 102 of the modular control system 100, where the host 141 may facilitate an access, assessment, or update of the controller version of the configuration file. The host 141 may store a "computing device version" 151 (and/or metadata associated therewith) of the configuration file. In certain situations, the computing device version 151 of the configuration file may represent a version which with the host 141 may attempt to configure the controller 102 (i.e., replace the controller version with the computing device version). Additionally, the host 141 may store a record of a "last backup instance" that may represent a most recent instance of the host 141 backing up the configuration file stored in the configuration database 104. FIGS. 4 and 5 discuss certain functionalities associated with assessing and managing the different versions of the configuration file.

Although some of the functionalities discussed herein describe a singular configuration file, it should be appreciated that multiple configuration files may be stored on the host 141 and the controller 102, where each configuration file may have a computing device version (i.e., stored on the host 141), a controller version (i.e., stored on the controller 102), and/or last backup instance. For example, each of the host 141 and the controller 102 may store a logic configuration file, a field device configuration file, and a graphics configuration file. Additionally, the host 141 and the controller 102 may store the same or different configuration files, where the respective configuration files may be the same or different. For example, the host 141 may store a logic configuration file and a graphics configuration file, and the controller 102 may store a logic configuration file and a field device configuration file (i.e., the controller 102 does not store a graphics configuration file and host 141 does not store a field device configuration file). Additionally, the logic configuration files respectively stored on the host 141 and the controller 102 may be different.

Figure 2:
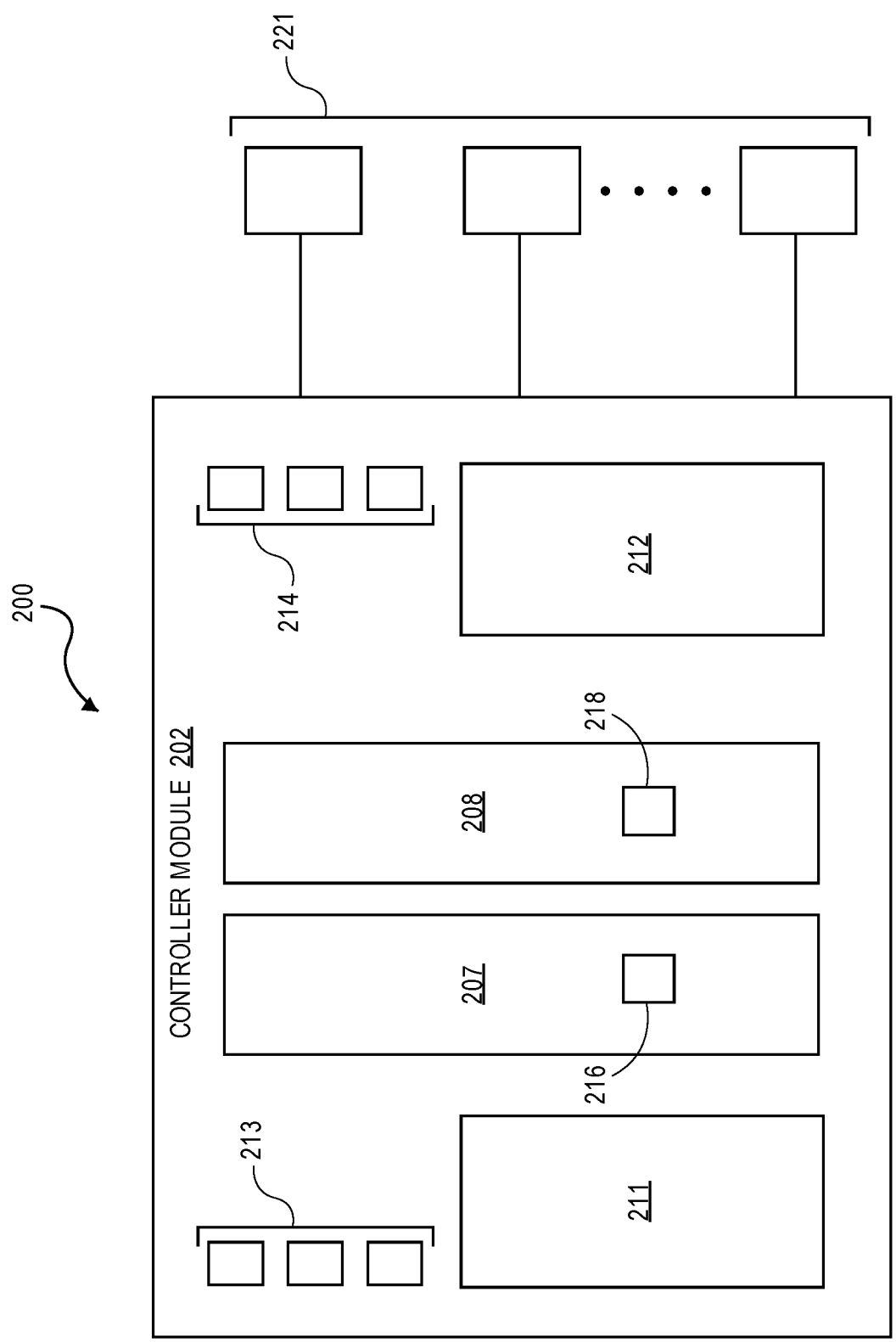
FIG. 2 is a schematic diagram of an example controller module, according to certain embodiments.

Additionally, the assessing, comparing, and updating functionalities, as discussed herein, may be applicable to any or all of the respective configuration files stored on the host 141 and the controller 102. In particular, the assessing, comparing, and updating functionalities may be facilitated in parallel or on a file-by-file basis. Accordingly, the systems and methods may enable the retrieval, reconciliation, and/or updating of certain individual configuration files (e.g., the configuration files having discrepancies), while other individual configuration files (e.g., identical configuration files) may be left unchanged. FIG. 2 illustrates a schematic diagram of certain components of an example controller module 202 associated with a modular control system 200. In embodiments, the controller module 202 may include two redundant distributed controllers 207 and 208, as well as associated switches 211 and 212, each controlling a set of communication ports (e.g., Ethernet ports) 213 and 214, respectively.

According to embodiments, the controller 207 may be considered the primary controller and the controller 208 may be considered the backup or redundant controller. Accordingly, in normal operation, the controller 207 may operate a set of process control devices 221; and in backup operation, the controller 208 may operate the set of process control devices 221.

Each of the controllers 207 and 208 may store respective versions of a configuration file that may specify or dictate how the set of process control devices 221 are operated. In particular, the controller 207 may store a version 216 of the configuration file, and the controller 208 may store a version 218 of the configuration file. It should be appreciated that the controller 207 and 208 may store multiple configuration files, each having respective versions. According to embodiments, the versions 216, 218 of the configuration file may be stored on a memory card (e.g., an SD card) interfaced with the respective controllers 207, 208. However, it should be appreciated that the versions 216, 218 of the configuration file may be stored on other types of memory (e.g., read-only memory (ROM), electronic programmable read-only memory (EPROM), random access memory (RAM), erasable electronic programmable read-only memory (EEPROM), and/or other hard drives, flash memory, and others).

Generally, the versions 216, 218 of the configuration file are identical. When a computing device interfaces with the controller module 202, the computing device may update the version 216 of the configuration file stored on the controller 207. The controller 207 may also cause the controller 208 to update its version 218 of the configuration file to match the updated version 216.

Figure 3:
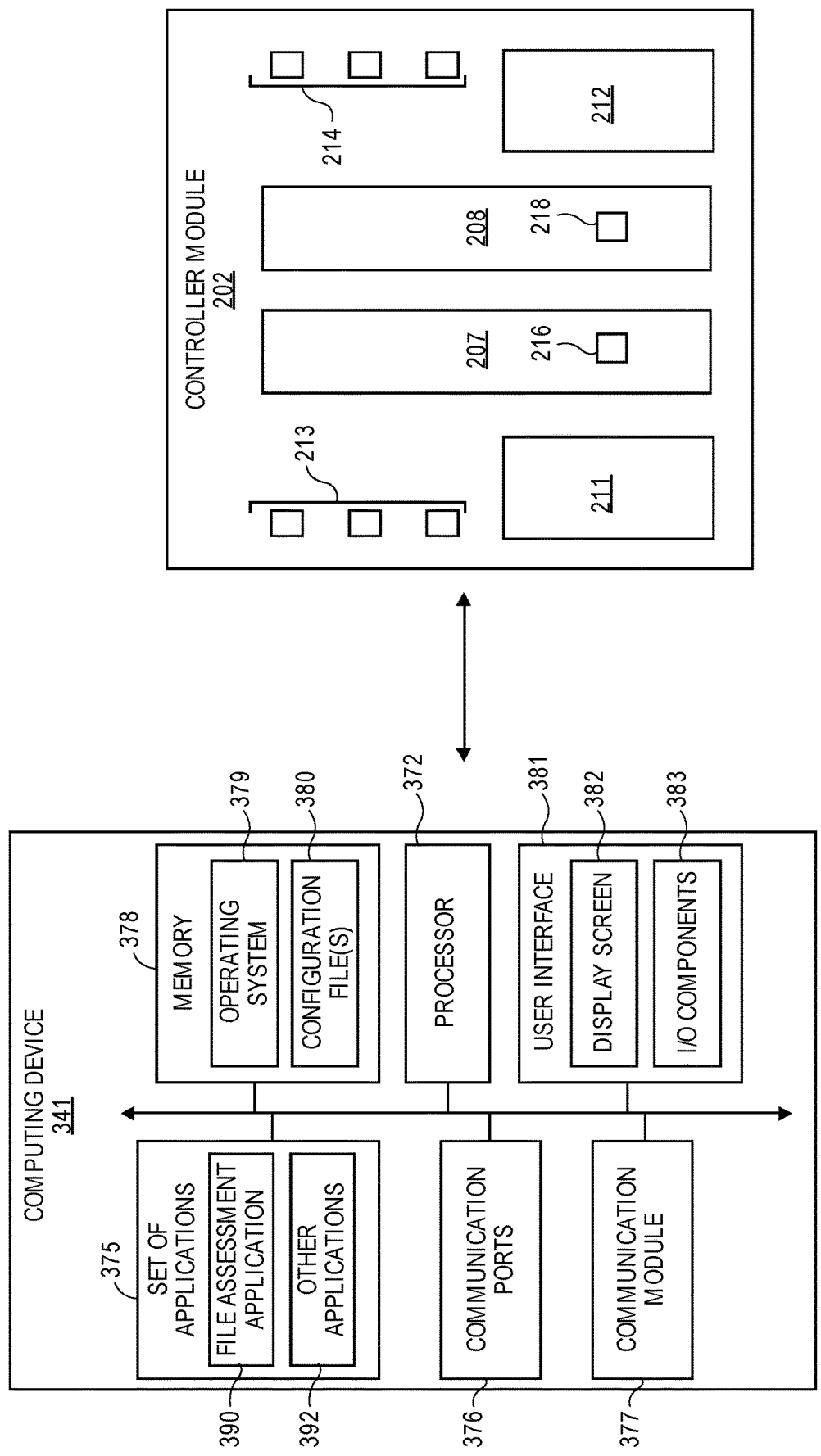
FIG. 3 is a schematic diagram of an example computing device and an example controller module, according to certain embodiments.

FIG. 3 illustrates a hardware diagram of an example computing device 341 (such as the host 141 as discussed with respect to FIG. 1) that may interface with the example controller module 202 as discussed with respect to FIG. 2, in which the functionalities as discussed herein may be implemented. According to embodiments, the computing device 341 may be any type of computing device configured to interface and communicate with the controller module 202, such as a laptop computer, desktop computer, tablet device, smartphone, smartwatch, smart glasses, or the like.

The computing device 341 may include a processor 372 as well as a memory 378. The memory 378 may store an operating system 379 capable of facilitating the functionalities as discussed herein as well as a set of applications 375 (i.e., machine readable instructions). For example, one of the set of applications 375 may be a file assessment application 390 configured to facilitate assessment and reconciliation of versions of configuration files. It should be appreciated that one or more other applications 392 are envisioned.

The processor 372 may interface with the memory 378 to execute the operating system 379 and the set of applications 375. According to some embodiments, the memory 378 may also store a configuration file(s) 380 and metadata thereof, where the configuration file(s) 380 may be the computing device version of the configuration file(s) as discussed herein. The memory 378 may additionally store metadata associated with the last backup instance of a configuration file by the computing device 341, as well data associated with a hash function and the output(s) thereof. In particular, a hash function output(s) may result from the configuration file(s) 380 being input into the hash function. The memory 378 may include one or more forms of volatile and/or non-volatile, fixed and/or removable memory, such as ROM, EPROM, RAM, EEPROM, and/or other hard drives, flash memory, memory cards, and others.

The computing device 341 may further include a communication module 377 configured to communicate data with the controller module 202, via a wired connection or via one or more wireless networks. According to some embodiments, the communication module 377 may include one or more transceivers (e.g., WWAN, WLAN, and/or WPAN transceivers) functioning in accordance with IEEE standards, 3GPP standards, or other standards, and configured to receive and transmit data via one or more communication ports 376. For example, the computing device 341 may connect to the controller module 202 via one or more of the respective communication port(s) 376, 213, 214.

The computing device 341 may further include a user interface 381 configured to present information to a user and/or receive inputs from the user. As shown in FIG. 3, the user interface 381 may include a display screen 382 and I/O components 383 (e.g., ports, capacitive or resistive touch sensitive input panels, keys, buttons, lights, LEDs). According to some embodiments, the user may access the computing device 341 via the user interface 381 to review information, make selections, and/or perform other functions.

In some embodiments, the computing device 341 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 372 (e.g., working in connection with the operating system 379) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

FIG. 4 depicts an example signal diagram 400 associated with assessing versions of a configuration file associated with a modular control system, and facilitating various functionalities based on a version comparison. The functionalities of the signal diagram 400 may be facilitated by a computing device 405 and a controller module 415. The computing device 405 may be similar to the computing device 341 as discussed with respect to FIG. 3 and may include at least a processor 472 and a memory 478. The controller module 415 may include a controller 410 (such as the controller 207 as discussed with respect to FIG. 2) and a memory 412. According to embodiments, the memory 412 may be any type of built-in or removable storage (e.g., an SD card) associated with or accessed by the controller 410. Although not illustrated in FIG. 4, the memory 412 may include a primary memory that may store a primary version of a configuration file and a backup memory that may store a backup version of the configuration file.

The objective of the computing device 405 (or a user of the computing device 405) may be to update the version of the configuration file stored in the memory 412 of the controller module 415 according to improvements, fixes, features, and/or the like made by personnel associated with the modular control system (e.g., an engineer, administrator, technician, or the like).

According to embodiments, the configuration file associated with the modular control system may include multiple versions. In particular, the memory 478 of the computing device 405 may store a "computing device version" of the configuration file, which may represent the version of the configuration file that a user of the computing device 405 may intend to update in the memory 412 of the controller module 415. The computing device version of the configuration file may have an associated "device hash output" that results from the computing device version being input into a hash function, which may also be stored by the memory 478. The memory 478 of the computing device 405 may further store a record or data indicative of a "last backup instance" of the configuration file (e.g., metadata including a timestamp(s)), which may represent a most-recent backup or update of the configuration file, by the computing device 405, in the memory 412 of the controller module 415.

The memory 412 of the controller module 415 may store a "controller version" of the configuration file, which is the version of the configuration file that is currently-stored in the memory 412 and that the controller 410 uses to control a set of applicable process control devices. The controller version of the configuration file may have an associated "controller hash output" that results from the controller version being input into the hash function, which may also be stored by the memory 412. According to embodiments, the device hash output and the controller hash output may be generated or determined upon generation of, or upon saving of, the respective versions of the configuration file, or at another time.

In embodiments, each of the memory 478 and the memory 412 may store multiple configuration files, where the configuration files stored in the memory 478 may be the computing device versions and the configuration files stored in the memory 412 may be the controller versions. The memory 478 may further store records or data indicative of last backup instances of the configuration files. Additionally, the memories 478, 412 may store multiple hash outputs respectively associated with the multiple versions of configuration files.

Although the signal diagram 400 describes the retrieval, access, comparing, resolving, and/or updating of a single configuration file, it should be appreciated that if multiple configuration files exist, the functionalities of the signal diagram 400 may be performed for each configuration file, either in parallel or sequentially.

The signal diagram 400 may begin when the processor 472 connects (420) to or interfaces with the controller 410 of the controller module 415. In embodiments, the processor 472 may connect to the controller 410 via respective communication ports of the computing device 405 and the controller module 415, and via at least one wired or wireless connection.

After connecting to the controller 410, the processor 472 may request (422) the controller 410 for the controller version of the configuration file. In embodiments, the processor 472 may request the entire configuration file or a portion thereof, and/or a set of metadata associated with the configuration file. For example, the set of metadata may include a timestamp identifying the time of the most recent update, and/or other metadata. The controller 410 may retrieve (424) the controller version of the configuration file from the memory 412. In embodiments, the controller 410 may retrieve data associated with the controller version according to the request from the processor 472.

The controller 410 may provide (426) the controller version of the configuration file (and/or any retrieved data according to the request) to the processor 472 via the respective communication ports, and via the at least one wired or wireless connection. The processor 472 may access (428) or inspect the computing device version of the configuration file as well as the data indicative of the last backup instance of the configuration file. In embodiments, the processor 472 may access, from the memory 478, the entire computing device version or a portion(s) thereof, and/or any metadata associated with the computing device version. Further, in embodiments, the processor 472 may access, from the memory 478, all of or a portion of the data indicative of the last backup instance of the configuration file.

The processor 472 may compare (430) the computing device version of the configuration file to the controller version of the configuration file. In comparing the versions, the processor 472 may additionally examine the data indicative of the last backup instance. In an implementation, the processor 472 may compare timestamp data of each of the computing device version, the controller version, and the data indicative of the last backup instance, where the timestamp data may indicate the most recent modification time, the most recent access time, and/or other temporal data, for the respective versions and the last backup instance. Accordingly, the processor 472 may determine, based on the timestamp data, which of the computing device version and the controller version is the most recent version, and how the temporal data compares to that of the last backup instance. It should be appreciated that alternative or additional metadata comparisons are envisioned.

In another implementation, the processor 472 may compare the device hash output associated with the computing device version to the controller hash output associated with the controller version, where the result of the comparison may indicate the presence of (or absence of) any difference(s) between the computing device version and the controller version. Generally, if the device hash output is different from the controller hash output, then the computing device version is different from the controller version. Similarly, if the device hash output is the same as the controller hash output, then the computing device version is the same as the controller version.

The hash output comparison may, in some situations, eliminate perceived conflicts that metadata associated with the versions of the configuration file may indicate. In a particular scenario, a timestamp of the computing device version may be different from a timestamp of the controller version, where a comparison of the timestamps may conclude that the computing device version is different from (e.g., more recent than) the controller version. However, the timestamps may not necessarily correspond to a file modification, and may instead correspond to, for example, a file access without a modification. Thus, while the timestamp comparison may indicate that the versions of the configuration file are different, the hash output comparison may indicate that the versions are, in fact, identical. In this scenario, the processor 472 may determine not to undertake a particular action based on the hash output comparison when the processor may otherwise undertake that particular action based on the metadata comparison (or vice-versa).

Based on the comparing functionality of (430), the processor 472 may determine (432) how to update and/or resolve the versions of the configuration file. In one scenario (referred to herein as "scenario A"), the comparison may indicate that the computing device version is more recent than the controller version and the last backup instance (e.g., has a timestamp that is more recent than those of the controller version and the last backup instance), and that the timestamp of the controller version matches that of the last backup instance. Thus, in scenario A, the processor 472 may determine that the computing device version should replace the controller version saved in the memory 412. In an implementation in scenario A, the processor 472 may not undertake action(s) to replace the controller version saved in the memory 412.

In another scenario (referred to herein as "scenario B"), the comparison may indicate that the timestamp of the computing device version matches that of the last backup instance, and that the controller version is more recent than the computing device version and the last backup instance (e.g., has a timestamp that is more recent than those of the computing device version and the last backup instance). Thus, in scenario B, the processor 472 may determine that the computing device version should be replaced by the newer controller version. In an implementation in scenario B, the processor 472 may not undertake action(s) to replace the computing device version with the newer controller version.

In another scenario (referred to herein as "scenario C"), the comparison may indicate that the computing device version is different from the controller version, that the computing device version is more recent than the last backup instance (e.g., has a timestamp that is more recent than that of the last backup instance), and that the controller version is more recent than the computing device version (i.e., the controller version is the most recent). Thus, in scenario C, the processor 472 may determine that reconciliation is needed between the computing device version and the controller version. In an implementation in scenario C, the processor 472 may not undertake action(s) to reconcile the computing device version with the controller version.

The processor 472 may optionally update or resolve (434) the computing device version, depending on the determined scenario. In particular, the processor 472 may update or resolve the computing device version if the determined scenario is either scenario B or scenario C. If the determined scenario is scenario B (i.e., the controller version is newer than the computing device version), then the processor 472 may cause the memory 478 to replace the stored computing device version with the controller version received in (426). Accordingly, the (updated) computing device version is up to date and a user of the computing device 405 may accordingly edit or modify the (updated) computing device version, for subsequent updating of the controller version of the configuration file.

If the determined scenario is scenario C (i.e., the controller version is more recent than the computing device version, which is more recent than the last backup instance), then the processor 472 may resolve discrepancies between the versions of the configuration files. In some embodiments, the processor 472 may automatically merge the updates or differences in the controller version with any updates or differences in the computing device version. In other embodiments, the processor 472 may cause the memory 478 to replace the computing device version with the controller version, or may cause the memory 412 to replace the controller version with the computing device version. In a further embodiment, the processor 472 may enable a user (e.g., via a user interface of the computing device 405) to select how to resolve the discrepancies. In particular, the user interface may indicate the discrepancies between the versions, and may enable the user to accept or decline certain additions, deletions, modifications, and/or the like.

After facilitating any updating or resolving functionalities, the processor 472 may optionally provide (436) the computing device version to the controller 410. In embodiments, if the determined scenario is scenario A (i.e., the computing device version is newer than the controller version and should replace the controller version stored in the memory 412), the processor 472 may provide the computing device version, as is, to the controller 410. In other embodiments, if the determined scenario is scenario C and the processor 472 facilitates any updating or resolving of the versions of the configuration file, the processor 472 may provide the updated or resolved version of the configuration file to the controller 410. Otherwise, in embodiments, if the determined scenario is scenario B, then the processor 472 may not need to provide any version of the configuration file to the controller 410.

After receiving the computing device version (or whatever version is provided by the processor 472), the controller 410 may provide (438) the received version to the memory 412. Accordingly, the memory 412 may update (440) the controller version to reflect the version provided by the controller 410 in (438). Thus, the controller version of the configuration file that is stored in memory 412 may be considered up-to-date and may reflect updates initiated by the user of the computing device 405.

FIG. 5 depicts a block diagram of an example method 500 of assessing versions of a configuration file associated with a modular control system in a process plant. According to embodiments, the method 500 may be facilitated by a computing device (and more specifically, a processor thereof) configured to connect to and interface with a controller associated with the modular control system. A memory of the computing device may store a computing device version of the configuration file and the controller may include a memory incorporated therein (e.g., an SD card) that may store a controller version of the configuration file. It should be appreciated that the functionalities of the method 500 are exemplary, and that additional or alternative functionalities are envisioned.

The method 500 may begin when the computing device interfaces (block 505) with the controller associated with the modular control system. In embodiments, the computing device may interface with the controller via respective communication ports, and may retrieve the controller version of the configuration file from the controller. The computing device may identify (block 510) a last backup instance of the configuration file representing a most recent backup of the configuration file by the computing device on the controller. In embodiments, the computing device may examine metadata (e.g., a timestamp) to identify the last backup instance.

The computing device may compare (block 515) the computing device version of the configuration file to the controller version of the configuration file. In some embodiments, the computing device may compare a set of timestamps respectively associated with the computing device version and the controller version of the configuration file. In other embodiments, the computing device version may have associated a device hash output produced by a hash function and the controller version may have associated a controller hash output produced by the hash function, and the computing device may compare the device hash output to the controller hash output. In comparing the computing device version to the controller version, the computing device may also examine data associated with the last backup instance.

The computing device may present (block 520), via a user interface, (i) an indication of each of the computing device version, the last backup instance, and the controller version, and (ii) a result of the comparing. In presenting the result of the comparing, the computing device may indicate in a visually distinctive manner (e.g., highlighting or underlining) which version of the configuration file is the most recent version. The computing device may optionally receive (block 525), via the user interface, a user selection associated with the result of the comparing. In particular, the user selection may correspond to a selection of a version of the configuration file that the user may want to review, modify, or cause an update.

The computing device may determine (block 530), based on the comparing of block 520, whether to update, retrieve, or resolve certain version(s) of the configuration file. If the computing device determines to update ("UPDATE"; i.e., the computing device version of the configuration file is more recent than the controller version of the configuration file and the last backup instance, or scenario A as discussed herein), the computing device may cause (block 535) the memory of the controller to update the controller version. In particular, the computing device may cause the controller version of the configuration file stored in the memory of the controller to be replaced by the computing device version of the configuration file. In an alternative implementation of scenario A, the computing device may take no further action (i.e., may not cause the memory of the controller to update the controller version).

If the computing device determines to retrieve ("RETRIEVE"; i.e., (i) the computing device version of the configuration file coincides with the last backup instance of the configuration file, and (ii) the controller version of the configuration file is more recent than the computing device version of the configuration file, or scenario B as discussed herein), the computing device may retrieve (block 540) the controller version of the configuration file from the memory of the controller. Further, the computing device may update (block 545) the computing device version of the configuration file according to the controller version. In particular, the computing device may replace the locally-stored computing device version of the configuration file with the controller version of the configuration file retrieved from the controller.

If the computing device determines to resolve ("RESOLVE"; i.e., the computing device version of the configuration file is more recent than the last backup instance, and the controller version of the configuration file is more recent than the computing device version of the configuration file, or scenario C as discussed herein), the computing device may retrieve (block 550) the controller version of the configuration file from the memory of the controller. Further, the computing device may resolve (block 555) the computing device version of the configuration file with the controller version of the configuration file. In particular, the computing device may merge updates between the versions, enable a user to select how to resolve the versions, or facilitate other functionalities, as discussed herein. In a particular implementation of scenario C, the computing device may resolve only the computing device version without modifying the controller version (or vice-versa).

Figure 6:
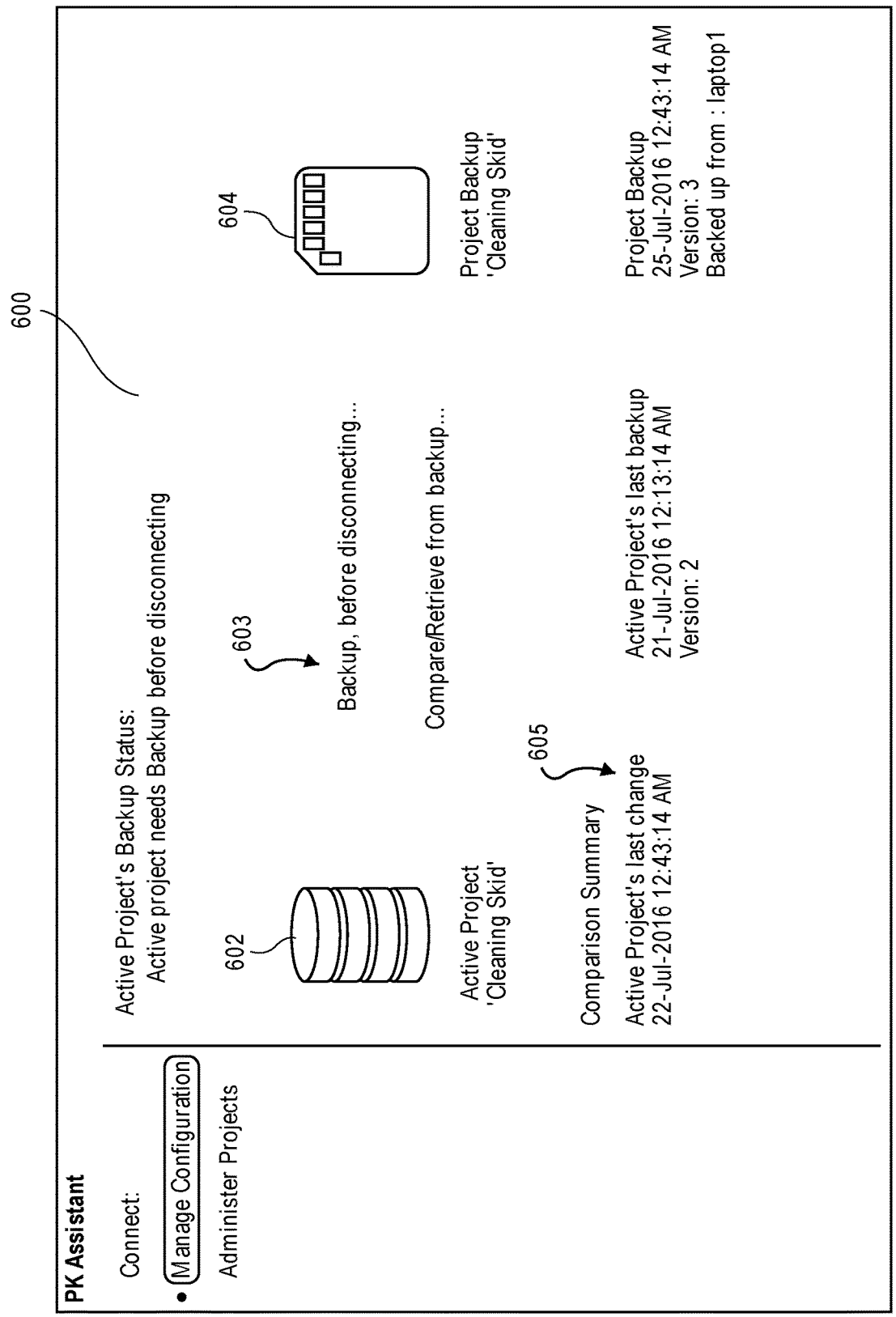
FIGS. 6 and 7 are example interfaces depicting certain information associated with a controller configuration, according to certain embodiments.
Figure 7:
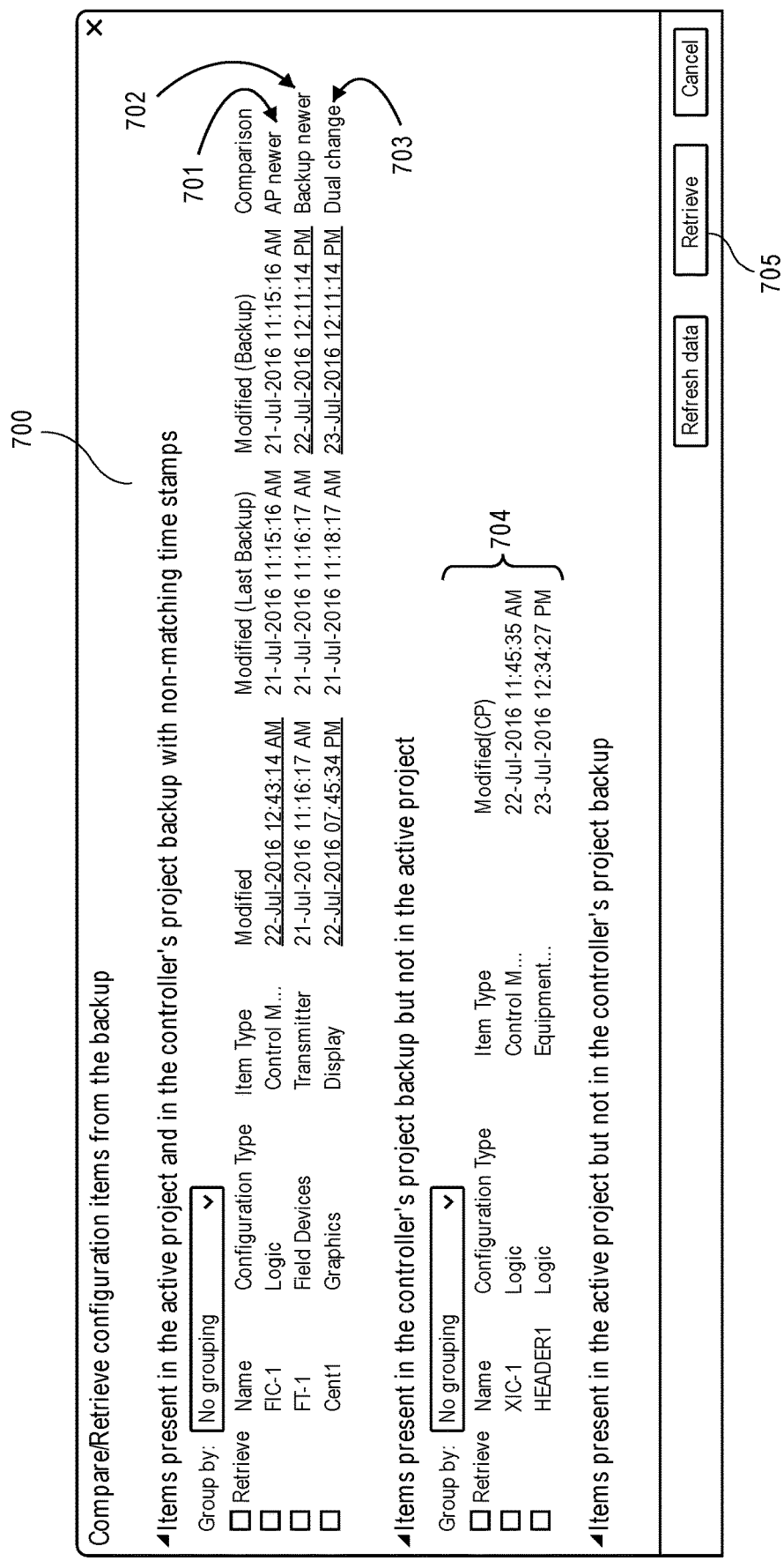

FIGS. 6 and 7 depict example interfaces 600, 700 associated with the embodiments and the functionalities thereof. A computing device (such as the computing device 341 as discussed with respect to FIG. 3) may be configured to present the interfaces 600, 700, where the computing device may connect to and interface with a controller of a modular control system. It should be appreciated that the content of the interfaces 600, 700 is merely exemplary, and that additional or alternative content is envisioned.

The interface 600 of FIG. 6 includes various information associated with an assessment of a configuration file(s). An icon 602 may represent the computing device and an icon 604 may represent the memory included in the controller of the modular control system, where each of the computing device and the memory may store one or more versions of a configuration file. A set of statuses 603 may indicate various actions undertaken by the computing device in assessing the version(s) of the configuration file, and a comparison summary 605 may summarize the assessment.

As depicted in FIG. 6, the comparison summary 605 indicates the last change of the computing device (i.e., the computing device version of the configuration file), the last backup of the computing device (i.e., the last backup instance of the configuration file), and the project backup (i.e., the controller version of the configuration file). Additional information associated with these versions is discussed with respect to FIG. 7.

The interface 700 of FIG. 7 includes details related to an assessment of versions of a configuration file, such as temporal metadata associated with the different versions. In particular, the interface 700 identifies three (3) configuration files (701, 702, 703) present on the computing device and the controller that have differing timestamps, and two (2) configuration files (704) that are present in the controller but not on the computing device.

Each of the identifications 701, 702, 703 for the respective configuration files may identify a name, configuration type, item type, modified timestamp (i.e., a timestamp for the computing device version), a modified (last backup) timestamp (i.e., a timestamp for the last backup instance), a modified (backup) timestamp (i.e., a timestamp for the controller version), and a result of the comparison. The identification 701 may correspond to scenario A in which the last backup instance and the controller version have the same timestamp and the computing device version has a more recent timestamp. The identification 702 may correspond to scenario B in which the computing device version and the last backup instance have the same timestamp and the controller version has a more recent timestamp. The identification 703 may correspond to scenario C in which the computing device version timestamp is more recent than the last backup instance timestamp, and the controller version timestamp is more recent than the computing device version timestamp.

The computing device may be configured to indicate, in a visually-distinctive manner, which of the versions may need to be assessed, compared, resolved, or the like. In particular, as illustrated in FIG. 7, the identification 701 associated with scenario A underlines the computing device version as it is the most recent version; the identification 702 associated with scenario B underlines the controller version as it is the most recent version; and the identification 703 associated with scenario C underlines each of the computing device version and the controller version, as these versions may need to be resolved.

The computing device may also be configured to enable a user of the computing device to make selections and facilitate certain actions associated with updating and resolving versions of the configuration file. In particular, each of the identifications 701, 702, 703 may include a selectable box to retrieve a certain version of the respective configuration file. In embodiments, when the user selects a retrieve box for a certain configuration file and selects a retrieve selection 705, the computing device may facilitate accessing or retrieving the applicable version(s) of the configuration file, displaying the applicable version(s), and enabling the user to make selections, facilitate merging, make edits or additions, and/or perform other edits. In an implementation, when the user selects the retrieve selection 705, the computing device may access or retrieve the version(s) of the configuration file that are displayed in the visually-distinctive manner (e.g., the highlighted version(s)).

Additional features associated with the techniques described herein are also envisioned. In particular, a visualization user interface (UI) may be provided that may display configuration information from the perspective of both the computing device and the controller. Additionally, the visualization UI may enable a merging of multiple versions of the configuration file, as discussed herein, where the computing device may be configured with "auto-merge functionality" that may automatically merge two versions of the same file while enabling a user to monitor and/or make additional selections (such as portions of the file that the computing device did not auto-merge. Moreover, the computing device may enable the user to select to save or keep multiple versions of the same file. Accordingly, the computing device may enable the user to select to save multiple versions, either with an automatically-chosen new filename for the copy or by enabling the user to input a filename.

Embodiments of the techniques described in the present disclosure may include any number of the following aspects, either alone or combination:

1. A computer-implemented method in a computing device of assessing versions of a configuration file associated with a modular control system in a process plant, the computing device storing a computing device version of the configuration file, the method comprising: interfacing, by the computing device, with a controller associated with the modular control system, the controller having a memory incorporated therein that stores a controller version of the configuration file; identifying a last backup instance of the configuration file representing a most recent backup of the configuration file on the controller by the computing device; comparing, by a processor of the computing device, the computing device version of the configuration file to the controller version of the configuration file; and presenting, via a user interface of the computing device, (i) an indication of each of the computing device version of the configuration file, the last backup instance of the configuration file, and the controller version of the configuration file, and (ii) a result of the comparing.

2. The computer-implemented method of claim 1, wherein comparing the computing device version of the configuration file to the controller version of the configuration file comprises: comparing a set of timestamps respectively associated with the computing device version of the configuration file and the controller version of the configuration file.

3. The computer-implemented method of claim 1, wherein the computing device version of the configuration file has associated a device hash output produced by a hash function and the controller version of the configuration file has associated a controller hash output produced by the hash function, and wherein comparing the computing device version of the configuration file to the controller version of the configuration file comprises: comparing the device hash output to the controller hash output.

4. The computer-implemented method of any of claims 1 to 9, wherein (i) the computing device version of the configuration file coincides with the last backup instance of the configuration file, and (ii) the controller version of the configuration file is more recent than the computing device version of the configuration file.

5. The computer-implemented method of claim 4, further comprising: retrieving, from the memory of the controller, the controller version of the configuration file; and updating the computing device version of the configuration file according to the controller version of the configuration file.

6. The computer-implemented method of any of claims 1 to 3, wherein the computing device version of the configuration file is (i) more recent than when the last backup instance of the configuration file occurred, and (ii) more recent than the controller version of the configuration file.

7. The computer-implemented method of 6, further comprising: causing the memory of the controller to update the controller version of the configuration file to the computing device version of the configuration file.

8. The computer-implemented method of any of claims 1 to 3, wherein the computing device version of the configuration file is more recent than when the last backup instance of the configuration file occurred, and wherein the controller version of the configuration file is more recent than the computing device version of the configuration file.

9. The computer-implemented method of claim 8, further comprising: retrieving, from the memory of the controller, the controller version of the configuration file; and resolving the computing device version of the configuration file with the controller version of the configuration file.

10. The computer-implemented method of any of claims 1 to 9, further comprising: receiving, via the user interface, a user selection associated with the result of the comparing.

11. A computing device for assessing versions of a configuration file associated with a modular control system in a process plant, comprising: a communication port; a user interface; a device memory storing (i) a set of computer-executable instructions, (ii) a computing device version of the configuration file, and (iii) a record of a last backup instance of the configuration file representing a most recent backup of the configuration file, by the computing device, on a controller associated with the modular control system; and a processor interfacing with the communication port, the user interface, and the memory, and configured to execute the set of computer-executable instructions to cause the processor to: interface, via the communication port, with the controller associated with the modular control system, the controller having a memory incorporated therein that stores a controller version of the configuration file, compare the computing device version of the configuration file to the controller version of the configuration file, and cause the user interface to present (i) an indication of each of the computing device version of the configuration file, the last backup instance of the configuration file, and the controller version of the configuration file, and (ii) a result of the comparing.

12. The computing device of claim 11, wherein to compare the computing device version of the configuration file to the controller version of the configuration file, the processor is configured to: compare a set of timestamps respectively associated with the computing device version of the configuration file and the controller version of the configuration file.

13. The computing device of claim 11, wherein the computing device version of the configuration file has associated a device hash output produced by a hash function and the controller version of the configuration file has associated a controller hash output produced by the hash function, and wherein to compare the computing device version of the configuration file to the controller version of the configuration file, the processor is configured to: compare the device hash output to the controller hash output.

14. The computing device of any of claims 11 to 13, wherein (i) the computing device version of the configuration file coincides with the last backup instance of the configuration file, and (ii) the controller version of the configuration file is more recent than the computing device version of the configuration file.

15. The computing device of claim 14, wherein the processor is configured to execute the set of computer-executable instructions to further cause the processor to: retrieve, from the memory of the controller, the controller version of the configuration file, and update, in the device memory, the computing device version of the configuration file according to the controller version of the configuration file.

16. The computing device of any of claims 11 to 13, wherein the computing device version of the configuration file is (i) more recent than when the last backup instance of the configuration file occurred, and (ii) more recent than the controller version of the configuration file.

17. The computing device of claim 16, wherein the processor is configured to execute the set of computer-executable instructions to further cause the processor to: cause the memory of the controller to update the controller version of the configuration file to the computing device version of the configuration file.

18. The computing device of any of claims 11 to 13, wherein the computing device version of the configuration file is more recent than when the last backup instance of the configuration file occurred, and wherein the controller version of the configuration file is more recent than the computing device version of the configuration file.

19. The computing device of claim 18, wherein the processor is configured to execute the set of computer-executable instructions to further cause the processor to: retrieve, from the memory of the controller, the controller version of the configuration file, and resolve the computing device version of the configuration file with the controller version of the configuration file.

20. The computing device of any of claims 11 to 19, wherein the processor is configured to execute the set of computer-executable instructions to further cause the processor to: receive, via the user interface, a user selection associated with the result of the comparing.

21. A computer-implemented method in a computing device of managing versions of a configuration file associated with a modular control system in a process plant, the computing device storing a computing device version of the configuration file, the method comprising: interfacing, by the computing device, with a controller associated with the modular control system, the controller having a memory incorporated therein that stores a controller version of the configuration file; comparing, by a processor of the computing device, the computing device version of the configuration file to the controller version of the configuration file; presenting, via a user interface of the computing device, (i) an indication of each of the computing device version of the configuration file, the controller version of the configuration file, and a last backup instance of the configuration file representing a most recent backup of the configuration file, by the computing device, on the controller, and (ii) a result of the comparing; receiving, via the user interface, a user selection associated with the result of the comparing; and based on the user selection, facilitating an update of at least one of: the computing device version of the configuration file and the controller version of the configuration file.

22. The computer-implemented method of claim 21, wherein presenting the result of the comparing comprises: visually indicating which of the computing device version, the controller version, and a time of the last backup instance of the configuration file is the most recent.

23. The computer-implemented method of either of claim 21 or claim 22, wherein the user selection is associated with the controller version of the configuration file, and wherein facilitating the update comprises: retrieving, from the memory of the controller, the controller version of the configuration file; and updating the computing device version of the configuration file according to the controller version of the configuration file.

24. The computer-implemented method of either of claim 21 or claim 22, wherein the user selection is associated with the computing device version of the configuration file, and wherein facilitating the update comprises: causing the memory of the controller to update the controller version of the configuration file to the computing device version of the configuration file.

25. A modular control system in a process plant, comprising: a set of process control devices communicatively connected to control a set of processes; a controller storing a controller version of a configuration file, and configured to operate the set of process control devices according to the controller version of the configuration file; and a computing device configured to interface with the controller, and storing (i) a computing device version of the configuration file, and (ii) a record of a last backup instance of the configuration file representing a most recent backup of the configuration file, by the computing device, on the controller, wherein the computing device is further configured to: compare the computing device version of the configuration file to the controller version of the configuration file, and present, via a user interface, (i) an indication of each of the computing device version of the configuration file, the last backup instance of the configuration file, and the controller version of the configuration file, and (ii) a result of the comparing.

26. The modular control system of claim 25, wherein to present the result of the comparing, the computing device is configured to visually indicate, in the user interface, which of the computing device version, the controller version, and a time of the last backup instance of the configuration file is the most recent.

27. The modular control system of either of claim 25 or claim 26, wherein the computing device is further configured to: receive, via the user interface, a user selection associated with the result of the comparing, and based on the user selection, facilitate an update of at least one of: the computing device version of the configuration file and the controller version of the configuration file.

28. The modular control system of any of claims 25 to 27, wherein to compare the computing device version of the configuration file to the controller version of the configuration file, the computing device is configured to: compare a set of timestamps respectively associated with the computing device version of the configuration file and the controller version of the configuration file.

29. The modular control system of any of claims 25 to 27, wherein the computing device version of the configuration file has associated a device hash output produced by a hash function and the controller version of the configuration file has associated a controller hash output produced by the hash function, and wherein to compare the computing device version of the configuration file to the controller version of the configuration file, the computing device is configured to: compare the device hash output to the controller hash output.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a commissioning tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "administrator," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method in a computing device of assessing versions of a configuration file associated with a modular control system in a process plant, the computing device storing a computing device version of the configuration file, the method comprising:
   interfacing, by the computing device, with a controller associated with the modular control system, the controller having a memory incorporated therein that stores a controller version of the configuration file, the controller version of the configuration file having associated (i) a controller hash output produced by a hash function and (ii) a modified backup timestamp, and the computing device version of the configuration file having associated (i) a device hash output produced by the hash function and (ii) a modified timestamp;
   identifying a last backup instance of the configuration file representing a most recent backup of the configuration file on the controller by the computing device;
   comparing, by a processor of the computing device, the device hash output of the computing device version to the controller hash output of the controller version, wherein a result of the comparing conflicts with a difference between the modified backup timestamp corresponding to the controller version and the modified timestamp corresponding to the computing device version;
   presenting, via a user interface of the computing device, (i) an indication of each of the computing device version of the configuration file, the last backup instance of the configuration file, and the controller version of the configuration file, wherein at least one of the computing device version, the last backup instance, or the controller version is a most recent version of the configuration file, (ii) the modified timestamp corresponding to the computing device version, a modified last backup timestamp corresponding to the last backup instance, and the modified backup timestamp corresponding to the controller version, (iii) the result of the comparing, and (iv) a retrieve selection;
   receiving, via the user interface, a selection of the retrieve selection; and in response to receiving the selection of the retrieve selection:
   accessing the at least one of the computing device version, the last backup instance, or the controller version that is the most recent version of the configuration file, and
   determining, by the processor based on the result of the comparing, to one of: update, retrieve, or resolve the at least one of the computing device version, the last backup instance, or the controller version that was accessed.

2. The computer-implemented method of claim 1, further comprising:
   comparing the modified timestamp corresponding to the computing device version of the configuration file to the modified backup timestamp corresponding to the controller version of the configuration file to determine the difference.

3. The computer-implemented method of claim 1, wherein (i) the computing device version of the configuration file coincides with the last backup instance of the configuration file, and (ii) the controller version of the configuration file is more recent than the computing device version of the configuration file.

4. The computer-implemented method of claim 3, wherein the controller version of the configuration file is accessed from the memory of the controller, and wherein the determining comprises:
   updating the computing device version of the configuration file according to the controller version of the configuration file.

5. The computer-implemented method of claim 1, wherein the computing device version of the configuration file is (i) more recent than when the last backup instance of the configuration file occurred, and (ii) more recent than the controller version of the configuration file.

6. The computer-implemented method of 5, wherein the computing device version of the configuration file is accessed, and wherein the determining comprises:
   causing the memory of the controller to update the controller version of the configuration file to the computing device version of the configuration file.

7. The computer-implemented method of claim 1, wherein the computing device version of the configuration file is more recent than when the last backup instance of the configuration file occurred, and wherein the controller version of the configuration file is more recent than the computing device version of the configuration file.

8. The computer-implemented method of claim 7, wherein the controller version of the configuration file is accessed from the memory of the controller, and wherein the determining comprises:
   resolving the computing device version of the configuration file with the controller version of the configuration file.

9. A computing device for assessing versions of a configuration file associated with a modular control system in a process plant, comprising:
   a communication port;
   a user interface;
   a device memory storing (i) a set of computer-executable instructions, (ii) a computing device version of the configuration file, and (iii) a record of a last backup instance of the configuration file representing a most recent backup of the configuration file, by the computing device, on a controller associated with the modular control system; and
   a processor interfacing with the communication port, the user interface, and the memory, and configured to execute the set of computer-executable instructions to cause the processor to:
      interface, via the communication port, with the controller associated with the modular control system, the controller having a memory incorporated therein that stores a controller version of the configuration file, the controller version of the configuration file having associated (i) a controller hash output produced by a hash function and (ii) a modified backup timestamp, and the computing device version of the configuration file having associated (i) a device hash output produced by the hash function and (ii) a modified timestamp,
      compare the device hash output of the computing device version to the controller hash output of the controller version, wherein a result of the comparing conflicts with a difference between the modified backup timestamp corresponding to the controller version and the modified timestamp corresponding to the computing device version,
      cause the user interface to present (i) an indication of each of the computing device version of the configuration file, the last backup instance of the configuration file, and the controller version of the configuration file, wherein at least one of the computing device version, the last backup instance, or the controller version is a most recent version of the configuration file, (ii) the modified timestamp corresponding to the computing device version, a modified last backup timestamp corresponding to the last backup instance, and the modified backup timestamp corresponding to the controller version, (iii) the result of the comparing, and (iv) a retrieve selection,
      receive, via the user interface, a selection of the retrieve selection, and in response to receiving the selection of the retrieve selection:
         access the at least one of the computing device version, the last backup instance, or the controller version that is the most recent version of the configuration file, and
         determine, based on the result of the comparing, to one of: update, retrieve, or resolve the at least one of the computing device version, the last backup instance, or the controller version that was accessed.

10. The computing device of claim 9, wherein the processor is further configured to:
   compare the modified timestamp corresponding to the computing device version of the configuration file to the modified backup timestamp corresponding to the controller version of the configuration file to determine the difference.

11. The computing device of claim 9, wherein (i) the computing device version of the configuration file coincides with the last backup instance of the configuration file, and (ii) the controller version of the configuration file is more recent than the computing device version of the configuration file.

12. The computing device of claim 11, wherein the controller version of the configuration file is accessed from the memory of the controller, and wherein to determine, based on the result of comparing to one of: update, retrieve, or resolve the at least one of the computing device version, the last backup instance, or the controller version that was accessed, the processor is configured to:

update, in the device memory, the computing device version of the configuration file according to the controller version of the configuration file.

13. The computing device of claim 9, wherein the computing device version of the configuration file is (i) more recent than when the last backup instance of the configuration file occurred, and (ii) more recent than the controller version of the configuration file.

14. The computing device of claim 13, wherein the computing device version of the configuration file is accessed, and wherein to determine, based on the result of comparing to one of: update, retrieve, or resolve the at least one of the computing device version, the last backup instance, or the controller version that was accessed, the processor is configured to:
cause the memory of the controller to update the controller version of the configuration file to the computing device version of the configuration file.

15. The computing device of claim 9, wherein the computing device version of the configuration file is more recent than when the last backup instance of the configuration file occurred, and wherein the controller version of the configuration file is more recent than the computing device version of the configuration file.

16. The computing device of claim 15, wherein the controller version of the configuration file is accessed from the memory of the controller, and wherein to determine, based on the result of comparing to one of: update, retrieve, or resolve the at least one of the computing device version, the last backup instance, or the controller version that was accessed, the processor is configured to:
resolve the computing device version of the configuration file with the controller version of the configuration file.

17. A computer-implemented method in a computing device of managing versions of a configuration file associated with a modular control system in a process plant, the computing device storing a computing device version of the configuration file, the method comprising:
interfacing, by the computing device, with a controller associated with the modular control system, the controller having a memory incorporated therein that stores a controller version of the configuration file, the controller version of the configuration file having associated (i) a controller hash output produced by a hash function and (ii) a modified backup timestamp, and the computing device version of the configuration file having associated (i) a device hash output produced by the hash function and (ii) a modified timestamp;
comparing, by a processor of the computing device, the device hash output of the computing device version to the controller hash output of the controller version, wherein a result of the comparing conflicts with a difference between the modified backup timestamp corresponding to the controller version and the modified timestamp corresponding to the computing device version;
presenting, via a user interface of the computing device, (i) an indication of each of the computing device version of the configuration file, the controller version of the configuration file, and a last backup instance of the configuration file representing a most recent backup of the configuration file, by the computing device, on the controller, wherein at least one of the computing device version, the last backup instance, or the controller version is a most recent version of the configuration file, (ii) the modified timestamp corresponding to the computing device version, a modified last backup timestamp corresponding to the last backup instance, and the modified backup timestamp corresponding to the controller version, (iii) the result of the comparing, and (iv) a retrieve selection;
receiving, via the user interface, a selection of the retrieve selection; and
in response to receiving the selection of the retrieve selection:
accessing the at least one of the computing device version, the last backup instance, or the controller version that is the most recent version of the configuration file, and
facilitating an update, based on the result of the comparing, of at least one of: the computing device version of the configuration file and the controller version of the configuration file.

18. The computer-implemented method of claim 17, wherein presenting the result of the comparing comprises:
visually indicating which of the computing device version, the controller version, and a time of the last backup instance of the configuration file is the most recent version.

19. The computer-implemented method of claim 17, wherein the controller version of the configuration file is accessed from the memory of the controller, and wherein facilitating the update comprises:
updating the computing device version of the configuration file according to the controller version of the configuration file.

20. The computer-implemented method of claim 17, wherein the computing device version of the configuration file is accessed, and wherein facilitating the update comprises:
causing the memory of the controller to update the controller version of the configuration file to the computing device version of the configuration file.

21. A modular control system in a process plant, comprising:
a set of process control devices communicatively connected to control a set of processes;
a controller storing a controller version of a configuration file, and configured to operate the set of process control devices according to the controller version of the configuration file, the controller version of the configuration file having associated (i) a controller hash output produced by a hash function and (ii) a modified backup timestamp; and
a computing device configured to interface with the controller, and storing (i) a computing device version of the configuration file having associated (i) a device hash output produced by the hash function and (ii) a modified timestamp, and (ii) a record of a last backup instance of the configuration file representing a most recent backup of the configuration file, by the computing device, on the controller, wherein the computing device is further configured to:
compare the computing device hash output of the computing device version to the controller hash output of the controller version, wherein a result of the comparing conflicts with a difference between the modified backup timestamp corresponding to the controller version and the modified timestamp corresponding to the computing device version,
present, via a user interface, (i) an indication of each of the computing device version of the configuration file, the last backup instance of the configuration file, and the controller version of the configuration file, wherein at least one of the computing device version, the last backup instance, or the controller version is a most recent version of the configuration file, (ii) the modified timestamp corresponding to the computing device version, a modified last backup timestamp corresponding to the last backup instance, and the modified backup timestamp corresponding to the controller version, (iii) a result of the comparing, and (iv) a retrieve selection, receive, via the user interface, a selection of the retrieve selection, and in response to receiving the selection of the retrieve selection:

access the at least one of the computing device version, the last backup instance, or the controller version that is the most recent version of the configuration file, and facilitate an update, based on the result of the comparing, of at least one of: the computing device version of the configuration file and the controller version of the configuration file.

22. The modular control system of claim 21, wherein to present the result of the comparing, the computing device is configured to visually indicate, in the user interface, which of the computing device version, the controller version, and a time of the last backup instance of the configuration file is the most recent version.

23. The modular control system of claim 21, wherein the computing device is further configured to:

compare the modified timestamp corresponding to the computing device version of the configuration file to the modified backup timestamp corresponding to the controller version of the configuration file to determine the difference.

\* \* \* \* \*